Figure 6:
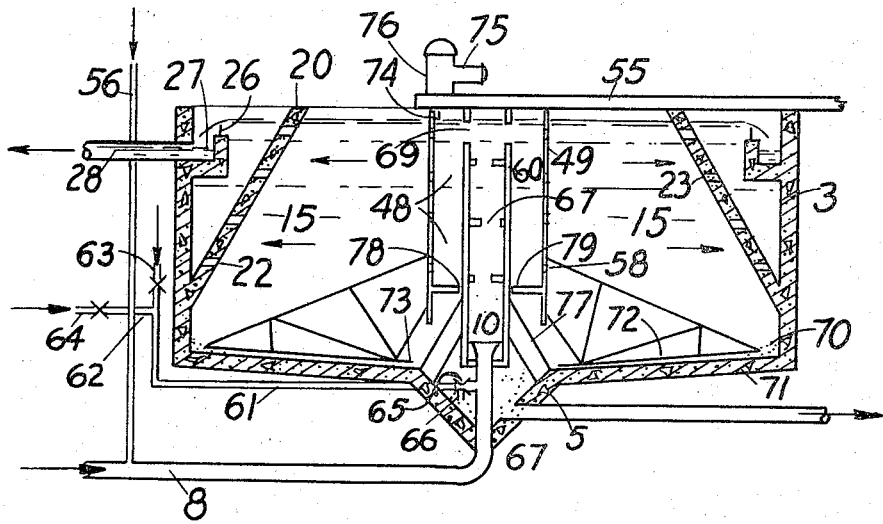

Nov. 21, 1967  A. A. HIRSCH  3,353,676
RADIAL FLOW SETTLING TANK WITH COMPLETE VOLUMETRIC
TRANSIT FOR WATER AND WASTE TREATMENT
Filed May 5, 1966  2 Sheets-Sheet 1
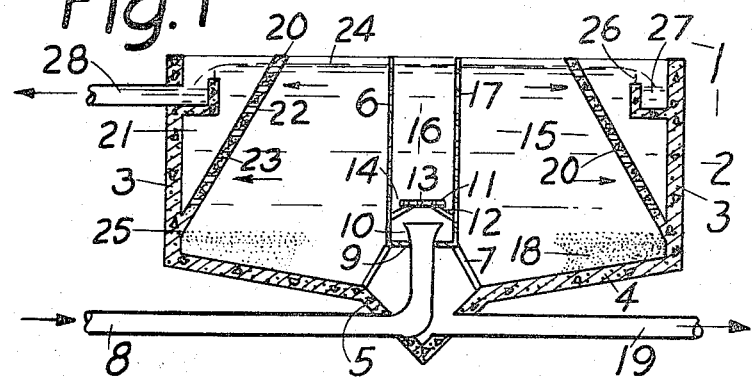
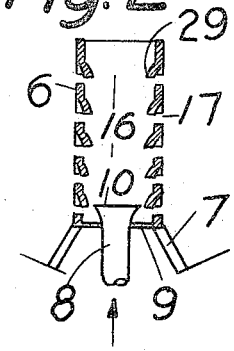
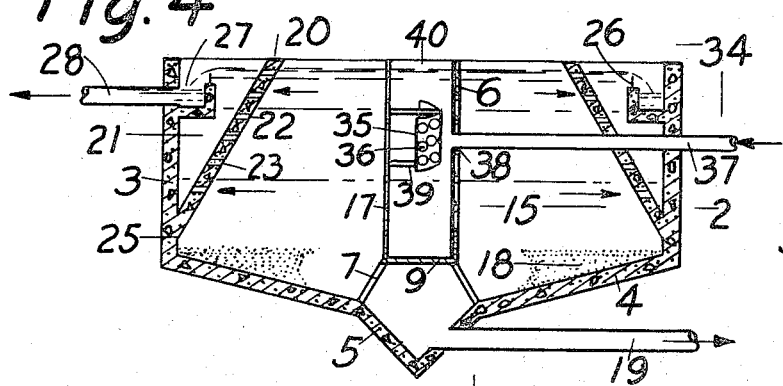
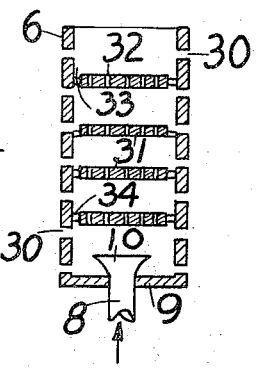
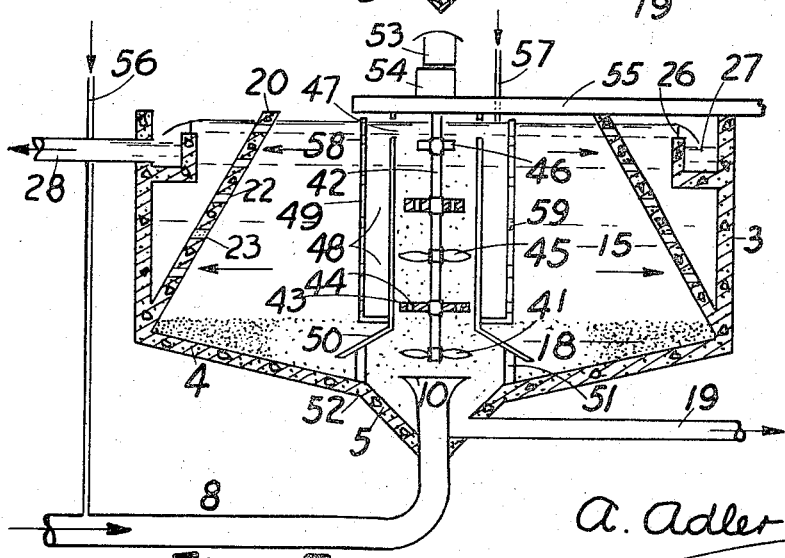
INVENTOR.
A. Adler Hirsch

United States Patent Office 3,353,676
Patented Nov. 21, 1967

3,353,676
RADIAL FLOW SETTLING TANK WITH COMPLETE VOLUMETRIC TRANSIT FOR WATER AND WASTE TREATMENT
A. Adler Hirsch, 141 Norwood St., Shreveport, La. 71105
Filed May 5, 1966, Ser. No. 547,901
1 Claim. (Cl. 210—197)

This invention relates to improvements in horizontal flow settling tanks or basins known to the art as radial flow tanks in which the influent is introduced at the center and the effluent withdrawn at the periphery.

In many existing radial flow tanks the influent is released into the settling zone at or near the surface of the liquid, thereby initiating a short circuit toward the effluent collection trough which is also located at the surface. Thus the bulk of the volume of the tank is unutilized for sedimentation. Also the velocity in the surficial sheet in which flow is concentrated is unnecessarily high, thereby restricting settling. My improvements consist in cooperative arrangements at the influent and effluent structures to induce a truly horizontal radial flow pattern across the entire depth of the settling zone and thus greatly increase potential throughput and improve clarity.

Of the various types of horizontal flow settling tanks the radial type theoretically should provide the best sedimentation efficiency because rate of flow therein is uniformly decelerated from the center outward toward the circumference. Since the settling rate of a given size of particle is determined by a high power of the velocity of the suspending liquid settleability is greatly enhanced in a tank of this type.

Use of deceleration in the case of horizontal flow settling tanks in which the direction of flow is essentially longitudinal from the influent end to the effluent end is embodied in my currently pending application Ser. No. 518,831, filed Jan. 5, 1966.

A radial type horizontal flow tank is more economical than an axial or longitudinal type horizontal flow tank in peripheral wall area and is more compact in plan. Hence the whole tank costs comparatively less per unit volume. It also has the advantage of symmetry. Radial type horizontal flow tanks may be circular or polygonal in peripheral outline. A further fundamental advantage is the decelerated flow in either case and the consequent potentially superior sedimentation.

In order to attain full volumetric flow through expanding sections of a radial type horizontal flow tank the influent must be uniformly released to the settling zone through an extensive and efficient distributive means, and the effluent must be gathered in a manner which does not interfere with or vitiate quiescent settling. An object of this invention is to provide such necessary inlet and outlet structures to produce cooperatively a complete and orderly volumetric transit of liquid across the settling zone.

Another object of this invention is to describe inlet structures for radial flow settling tanks which will enable most advantageous cooperative application of the inclined orificed effluent baffle set forth in U.S. Patent No. 3,221,889.

In order to accomplish these objectives the following two provisions are introduced: (1) The influent is guided through openings in a central cylindrical shell, these openings being regulated by field tests to insure uniform passage of the liquid at all levels, and (2) the settled liquor at the end of the sedimentation zone is withdrawn through an inclined orificed effluent baffle training wall, as described in Patent No. 3,221,889, placed in advance of the final gathering means. This training wall confronts or contraposes the influent release shell radially across the complete tank. Hence another object of this invention is to describe a radial type horizontal flow tank having such influent and effluent structures in substantially complete cylindrical contraposition and to show their cooperation to achieve decelerated radial flow substantially free from vertical components throughout the settling zone. The flow front for such a tank will be cylindrical as the particles advance, hence another object of this invention is to describe a settling tank having a truly cylindrical flow front.

Such a simple and symmetrical flow front precludes short circuiting, jetting, dead spaces, interferences from discontinuities, wall effects and terminal updraft. Hence another object of this invention is to avoid the foregoing deficiencies in settling basin performance. By perfecting sedimentation on the clarity of the effluent is increased, therefore a further object of this invention is to obtain lowest possible residual particulate content therein.

In comparison to upflow tanks a horizontal flow radial type tank is superior for sedimentation since only minor deceleration can be built into upflow; also to date upflow tanks lack the complete effluent guidance of Patent 3,221,889, and my copending application Ser. No. 547,902, filed on even date herewith, and now U.S. Patent 3,300,047, to make such training action occur. Other centrally entrant tanks are of the mixed flow type, having an annular entry of the influent at the bottom with either crowfoot or circumferential draw off weirs for the effluent. The unbaffled crowfoot weirs permit a degree of short circuiting, and the circumferential weirs patently induce short circuiting and dead volumes. So, considering all types of central-entry tanks the radial outward horizontal flow type is the most efficient, and hence is capable of improved performance by the novel arrangements described below.

The purpose of this invention is obtained by flocculating the suspended solids, when necessary, either prior to introduction into the radial flow tank or in a central core structure fitted for this purpose, then passing the liquid out through a full depth influent dispensing wall having properly distributed orifices, some of them plugged as needed, formed with or without deflective shields, into the settling zone of the tank and finally gathering the clarified effluent through an inclined orificed effluent training wall substantially equal in depth to the perforated influent wall. A further object of this invention is to adapt this flow sequence to various modifications of radial flow tanks, involving differences in level of influent introduction, provisions for chemical treatment and means for recirculating sludge.

These details are shown in the drawing in which:

FIGURE 1 is a cross section of a radial flow settling tank into which the influent feeds from the bottom FIGURE 2 is a cross section showing in greater detail the lipped configuration of the distribution ports in the central riser of FIGURE 1

FIGURE 3 is a cross section of an alternative construction of the central riser, of particular use when a mixing action is required FIGURE 4 is a cross section of a radial flow settling tank into which the influent feeds from the side at an intermediate depth FIGURE 5 is a cross section of a radial flow settling tank having provision for sludge contact as a part of chemical treatment, and FIGURE 6 is a vertical cross section of a radial flow settling tank which is provided with a mechanically rotated rake for sludge removal.

Reference is now directed to the various separate views:

In FIGURE 1 the radial flow settling unit 1 consists of a circular tank 2 with side walls 3, a markedly sloping floor 4 and a central sump 5. At the center is a riser tube 6 supported on columns 7 which rest on the floor straddling the sump. Influent pipe 8 delivers water or other liquid through the bottom plate 9 of the riser 6, discharging through a flared outlet 10 against a spreader plate 11. This plate 11 is suported by ties or brackets 12 joined to the sides of the riser tube 6. Orifices 13 in the spreader plate and the marginal passages 14 around its edges allow an even upflow of liquid in the riser tube.

The riser tube, which is the central dispensing structure, distributes the incoming liquid uniformly and with minimum turbulence into the quiescent settling zone 15. Liquid passes from the receiving zone 16 in the riser to the settling zone through orifices 17 located all around the cylindrical shell of the riser. These openings may be formed to facilitate passage of the upflowing liquid from the riser.

At the bottom of the settling zone 15 is the sludge zone 18 into which the suspended solids of the traversing liquid fall. These solids move along the sloping floor 4 into the sump 5 from which they are drained through the desludging line 19.

An inclined orifice baffle wall 20 separates the settling zone 15 from the effluent draw off zone 21. Most of the orifices 22 in this baffle are open, but some are plugged or closed 23 as indicated by field observations to be desirable for uniform approach. The inclined baffle wall extends from slightly above the operational surface level 24 in the tank to its juncture 25 with the side wall about the level of the top of the sludge zone. Liquid in the settling zone flows in truly horizontal stream lines, as denoted by the arrows, with uniformly decreasing radial velocities as the particles move toward the inclined orificed wall.

Liquid in the draw off zone 21 flows over the top of weir plate 26 and spills into peripheral launder 27 from whence it is discharged through effluent conduit 28.

FIGURE 2 shows closer detail of the distributive lipped orifices 17 in the central riser 6. The incurving deflecting lips 29 are formed by denting inwardly the area of the shell 6 immediately above the hole 17. Ascending liquid, instead of sweeping by, as would be the case with a plain orifice, is deflected into each passageway. This prevents a disproportionate flow through the openings at the top section of the riser tube. The presence of deflective guidance also makes a diffuser or spreader plate 11, as in FIGURE 1, somewhat unnecessary. Thus, a uniform flow of liquid is obtained across the whole riser tube shell into the settling portion of the tank.

An alternative construction of the central riser 6 is shown in FIGURE 3. In this case the cylindrical shell 6 contains a series of plain holes 30 along its side. Uniform distribution of effluent is accomplished by interposing several spreader plates 31 along the course of the riser contents. These plates have orifices 32 and marginal openings 33 to permit passage of liquid to the overlaying sections. Some of the liquid at a given level passes out through the side holes 30. The remainder rises through the higher spreader plates. The resistance of the spreader plates prevents the liquid pushing in bulk by inertia to the orifices near the top of the riser tube. These plates are supported by brackets or tie rods 34 attached to the inside wall of the riser shell 6.

FIGURE 4 illustrates another version of a radial flow settling or sedimentation tank 34 differing from that of FIGURE 1 mainly in the introduction of influent intermediate in the height of the riser tube 6 and the provision of a deflector plate 35 with orifices 36 to diffuse the influence current.

Water or other liquid enters the tank through influent line 37 which discharges at point 38 into the central riser tube 6, the liquid impinging on diffuser plate 35. Lipped orifices 17 in the wall of the central riser 6 aid in distributing the liquid uniformly into the quiescent settling zone 15. The deflector plate is supported by brackets or ties 39 attached to the inside wall of riser 6.

Influent, here shown entering the riser at an intermediate level may just as well have been introduced into the riser space 16 at the top 40 provided a deflector plate, such as that in FIGURE 1, is inserted in the stream to distribute the flow properly. The riser designs shown in FIGURES 2 and 3 likewise would be applicable, except the lips 29 of FIGURE 2 in this case would be formed inwardly on the bottom of the orifices 17 instead of the top. Since no additional principles are involved this detail is not illustrated.

Structure and operation of the tank beyond the stage of the central riser or receiving zone 16 is identical with corresponding features of FIGURE 1.

FIGURES 5 and 6 show variants of the radial flow tank in which chemical treatment is provided prior to sedimentation. In these cases a downdraft tube becomes the central dispensing structure.

In FIGURE 5 liquid enters the tank at the bottom through bell mouth 10 at the end of the inlet pipe 8. This pipe rises into the sludge sump 5 and discharges influent liquid into the sludge zone 18 below bottom impeller 41. This impeller is set on drive shaft 42 which also bears an agitator 43 with orifices 44 set above the impeller, and other impellers 45 and similar agitators thereabove. A smaller agitator blade 46 is mounted near the top of the shaft where the liquid is about to pass through ports 47 from the central riser into the annular space 48 enclosed by the downdraft tube 49.

The central riser tube is flared at the bottom 50; these flares rest on piers 51 which transmit the weight of the structure to the sloping floor just before the joint 52 with the conical walls of the sump 5. The riser also supports the downdraft shell 49, the motor 53 and reduction gear box 54 driving the agitator shaft 42 and half the weight of the walkway 55 span between the side wall 3 and the center of the tank.

Chemicals are added to the inflowing liquid while still in the influent pipe 8 through chemical feed line 56. A second dose of chemical may be added through intermediate feed line 57 to the liquid entering the downduct. This second line may also have been placed to discharge into the top of the riser tube in cases where more agitation is desired.

Orifices 58 in the downduct shell permit treated liquid to enter the settling zone 15 where its velocity is progressively reduced as flow is toward the inclined orificed baffle wall 20. These orifices 58 in the illustration are shown as plain circular openings. Some of them may be plugged 59 to distribute efflux uniformly into the settling zone 15.

The remaining features of the tank resemble those in FIGURES 1 and 4.

FIGURE 6 shows in vertical cross section a truly radial flow settling tank which provides both treatment and mechanical sludge removal. This combination of radiality in flow, without a vertical component, device for initial treatment and mechanically operated desludging is the first time the aggregate as a whole has been described as well as the first time truly radially outward flow toward the periphery has ever been achieved.

As in FIGURES 1 and 5, water or liquor enters through inlet line 8 which extends up through the central cludge sump 5. This line terminates as a bell mouth 10 at the bottom of central riser 60. Chemical is fed through feed line 56, entering the inlet 8 external to the tank. Another feed line 61, branched at T 62, receives chemical through branch 63 and high pressure water through the other branch 64. Line 61 passes through sludge sump 5 to an injector 65 with suction nipple 66 open to the sludge scrapings. This injector mixes chemical and sludge and forces the mixture into the influent line 8 at point 67.

Influent and sludge mixed therewith leave the influent line through bell mouth outlet 10 into the bottom of the central riser 60. This riser is fitted with staggered openings 67 to create turbulence within the ascending slurry. This mixture passes from the central riser through ports 69 near the top into the annulus 48 within the downduct 49. The downduct contains a multiplicity of orifices 58, some of them plugged, like in FIGURE 5, as shown desirable by field test, which uniformly distribute the slurry mixture into the quiescent settling zone 15 of the tank. In the settling zone the flow is horizontal only, governed by the uniform distribution through the downduct orifices and the stabilizing action of the inclined orificed effluent baffle 20. Further effluent end features of the tank are similar to those in FIGURES 1, 4 and 5.

Sludge 70 settling in the quiescent zone 15 falls to the sloping floor 71 where it is scraped by revolving rake 72 to the central sump. A spur 73 toward the central end of the rake continues the movement of the sludge toward the sump. The rake is supported from the downdraft duct at the top of which is a gear drive 74 and a set of bearings. A motor 75 and reduction gear housing 76 are mounted on walkway 55 above the drive gear. The inboard support of the walkway and the pendant weight of the downdraft tube and revolving rake are borne by the central riser which is supported by piers 77 straddling the central sump 5. Clearance 78 is allowed between the floor 79 of the downdraft duct and the shell of the central riser to permit rotation and to allow some degree of short circuiting of the dilute slurry toward the sump to lighten the sludge. Further mechanical details are well known and do not form a part of this application.

The inclined orificed effluent baffle 20 may be constructed either monolithically or of lightweight materials, as described in Patent No. 3,221,889. If made of concrete it may be supported by such methods as (a) a heavily reinforced crotch 25, (b) columns based on the sloping floor 4, or by (c) tie-rods strutting from the side walls 3. These details, not involving principles of performance, have been omitted from the drawings.

Although circular tanks and peripheral weirs have been described as the best embodiment for the improvements in radial flow settling tanks other shapes of peripheral outlines and other less efficient draw off arrangements come within the scope of the following claims. Similarly, other than circular sections for the central riser and downdraft duct also come within the coverage of this application and its claim.

I claim:

A radial flow settling tank consisting of
a circumferential wall,
a central receiving and dispensing structure composed of a central riser and a downdraft tube concentric thereto and spaced therefrom,
an influent line which delivers liquid to the bottom of said central riser,
a quiescent settling zone concentric with said downdraft tube and extending radially outward therefrom,
a sludge zone at the bottom of said settling zone,
a slightly sloping floor having a central sludge sump at the bottom of said tank,
a sludge draw off line connected to said central sump,
an effluent draw off line at said circumferential wall having a draw off collection means leading thereto, and
a bottom plate closing said central riser, said influent line terminating in a bell mouth which passes through said bottom plate,
a chemical feed line to introduce reagents into said influent line in advance of its entry into said central riser,
an injector means driven by a high pressure water line for recirculating sludge into said influent line below said bell mouth, said injector means drawing suction from said central sludge sump,
a chemical feed line connection to the high pressure water line to said injector,
a tier of shelves in said central riser with relatively large openings therein, said openings being staggered in position between adjacent shelves to promote turbulence,
a passageway at the top of said central riser leading into said concentric downdraft tube,
a floor near the bottom of said downdraft tube extending inwardly toward said central riser, an annular clearance between said floor and said central riser,
an extension on said downdraft tube below said floor of the downdraft tube for attachment of a mechanical rake to scrape sludge on said slightly sloping floor of said tank toward said central sump,
drive means at the top of said downdraft tube to rotate same and said mechanical rake attached thereto,
a source of power supported on top of said central riser for the purpose of rotating said mechanical rake,
piers at the bottom of said central riser to transmit the weight of said central receiving and dispensing structure, said source of power and said mechanical rake to the floor of said tank,
perforations in the cylindrical wall of said downdraft tube and terminating at the top of said sludge zone, plugs in some of said perforations to equalize the flow of liquid radially outward into said settling zone at all levels above said sludge zone,
an inclined orificed baffle wall extending substantially the full depth of the perforated section of said downdraft tube and facing same across said quiescent settling zone, said inclined orificed wall extending from said circumferential wall and extending the full circumference thereof,
said settling zone extending from said downdraft tube to said inclined orificed wall,
said inclined orificed wall and said circumferential wall forming a draw off zone from which effluent flows to said draw off collection means,
said inclined orificed wall and said perforated downdraft tube cooperating to retain uniform horizontal flow of liquid radially outward throughout said quiescent settling zone without vertical components of flow therein,
said inclined orificed wall withdrawing liquid from said quiescent settling zone with avoidance of terminal uplift of suspended matter, and
plugs in some of the orifices in said inclined orificed wall to regulate the uniformity of flow through said quiescent settling zone in direction and amount.

References Cited

UNITED STATES PATENTS

| | | | |
|---|---|---|---|
| 830,552 | 9/1906 | Zeigler | 210—221 X |
| 1,065,542 | 6/1913 | Main | 210—519 |
| 1,374,625 | 4/1921 | Allen | 210—519 |
| 1,493,861 | 5/1924 | Kusch | 210—519 |
| 1,887,177 | 11/1932 | Adams | 210—519 |
| 2,140,059 | 12/1938 | Simonsen | 210—519 X |
| 2,219,706 | 10/1940 | Jones | 259—122 |
| 2,391,738 | 12/1945 | Prager | 210—208 |
| 2,411,386 | 11/1946 | Parker et al. | 210—197 |
| 2,527,788 | 10/1950 | Bieker et al. | 210—197 |
| 2,678,914 | 5/1954 | Kalinske | 210—221 X |
| 3,152,071 | 10/1964 | Kraft | 210—197 X |
| 3,221,889 | 12/1965 | Hirsch | 210—532 |

FOREIGN PATENTS 847,203   9/1960   Great Britain.

REUBEN FRIEDMAN, *Primary Examiner.*

J. DE CESARE, *Assistant Examiner.*